(12) United States Patent
Nagano et al.

(10) Patent No.: US 12,381,404 B2
(45) Date of Patent: Aug. 5, 2025

(54) CHARGING SERVICE SYSTEM, PORTABLE CHARGER, AND SERVICE SERVER FOR CHARGING SERVICE

(71) Applicant: PRIME PLANET ENERGY & SOLUTIONS, INC., Tokyo (JP)

(72) Inventors: Kodai Nagano, Nagoya (JP); Atsushi Sugihara, Toyota (JP); Shizuka Masuoka, Nagoya (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 775 days.

(21) Appl. No.: 17/591,146

(22) Filed: Feb. 2, 2022

(65) Prior Publication Data

US 2022/0255331 A1    Aug. 11, 2022

(30) Foreign Application Priority Data

Feb. 8, 2021    (JP) ................... 2021-018122

(51) Int. Cl.
*H02J 7/00* (2006.01)
*G06F 21/31* (2013.01)
*H02J 50/80* (2016.01)
*H02J 50/10* (2016.01)

(52) U.S. Cl.
CPC ......... *H02J 7/00045* (2020.01); *G06F 21/31* (2013.01); *H02J 50/80* (2016.02); *H02J 7/0048* (2020.01); *H02J 50/10* (2016.02)

(58) Field of Classification Search
USPC .............. 320/106, 107, 108, 109, 110, 112
See application file for complete search history.

(56) References Cited

U.S. PATENT DOCUMENTS

| 2016/0006264 | A1 | 1/2016 | Alperin et al. |
| 2016/0225104 | A1* | 8/2016 | Yamaguchi .......... B60L 53/665 |
| 2020/0067149 | A1 | 2/2020 | Li |
| 2021/0004848 | A1 | 1/2021 | Nakajima et al. |

FOREIGN PATENT DOCUMENTS

| CN | 106981892 A | 7/2017 |
| CN | 111162331 A | 5/2020 |
| CN | 111670451 A | 9/2020 |
| JP | 2004222457 A * | 8/2004 |

(Continued)

*Primary Examiner* — Brian Ngo
(74) *Attorney, Agent, or Firm* — Finnegan, Henderson, Farabow, Garrett and Dunner, LLP

(57) ABSTRACT

A portable charger has a pre-assigned battery ID. The portable charger includes a wireless power receiving device corresponding to a wireless power transfer device, and a communication device being communicable with a mobile communication terminal. The mobile communication terminal stores the battery ID and a user ID in association with each other. The service server stores the battery ID, the user ID, and a validity of a service user's right to receive a chatting service, in association with each other. The service server is configured to acquire the battery ID and the user ID from the mobile communication terminal and execute an authentication process of determining the validity of the service user's right to receive the charging service for the portable charger that is, identified by the acquired battery ID based on the acquired user ID.

15 Claims, 3 Drawing Sheets

(56) References Cited

FOREIGN PATENT DOCUMENTS

| | | | |
|---|---|---|---|
| JP | 2014-036487 A | | 2/2014 |
| JP | 2015-049851 A | | 3/2015 |
| KR | 20150010017 A | * | 1/2015 |
| KR | 10-2017-0019848 A | | 2/2017 |
| KR | 10-2017-0123074 A | | 11/2017 |
| WO | WO 2021-005706 A1 | | 1/2021 |

* cited by examiner

CHARGING SERVICE SYSTEM, PORTABLE CHARGER, AND SERVICE SERVER FOR CHARGING SERVICE

CROSS REFERENCE TO RELATED APPLICATIONS

The present application claims priority from Japanese Patent Application No. 2021-018122 filed on Feb. 8, 2021, which is incorporated by reference herein in its entirety.

BACKGROUND

The present disclosure relates to a charging service system, a portable charger, an application software for a mobile communication terminal, and a service server for a charging service.

JP 2014-036487 A discloses a technique related to an electric vehicle charging system. The publication discloses a charging control method in which the status of cable connection is checked for each charging connector and thereafter user authentication is performed so that start of charging is permitted at the stage where it has been confirmed that the connector's connection and the user authentication are complete. The publication also states that, by desirably selecting the procedure for starting the charging, it is possible to achieve a charging system that is capable of flexibly switching user authentication to an authentication-free mode capable of handling both pre-authentication and post-authentication.

SUMMARY

The present inventors are considering providing a rapid charging service that achieves rapid charging of portable chargers, which are used for smartphones and other devices. For such a rapid charging service for portable chargers, it is desired to introduce a system that is able to start charging within a short time, including authentication, so as to meet the demand of the service user's who are in desperate need of charging.

A charging service system according to the present disclosure includes a changing apparatus, a portable charger, a mobile communication terminal, and a service server. The charging apparatus includes a wireless power transfer device. The portable charger possesses a pre-assigned battery ID, and the portable charger includes a wireless power receiving device corresponding to the wireless power transfer device, and a communication device being communicable with the mobile communication terminal. The mobile communication terminal stores the battery ID and a user ID in association with each other. The service server stores the battery ID, the user ID, and validity of service user's right to receive the charging service in association with each other. The service server is configured to acquire the battery ID and the user ID from the mobile communication terminal and execute an authentication process of determining the validity of the service user's right to receive the charging service for the portable charger that is identified by the acquired battery ID based on the acquired user ID. The just-described charging service system allows the authentication process for determining the validity of the service user's right to he complete by communication between the mobile communication terminal and the service server. As a result, the service user is allowed to start charging within a short time, including the authentication.

The mobile communication terminal may be configured to be allowed to send a start charging signal to the portable charger identified by the battery ID if the user's right to receive the charging service is valid. The mobile communication terminal may be configured to acquire the battery ID from the service server and to be able to send a start charging signal to the portable charger identified by the battery ID stored in the service server if the service user's right to receive the charging service is valid.

The mobile communication terminal may include an application software installed thereon for connecting the mobile communication terminal to the service server. The application software may be configured to be launched on the mobile communication terminal and to execute the authentication process when the mobile communication terminal is connected to the service server. The mobile communication terminal may be configured to execute a report process of prompting the user to place the portable charger onto the charging apparatus if the service user's right to receive the charging service is valid. Additionally, the application software may be configured to be launched on the mobile communication terminal when the portable charger is detected to be placed on the charging apparatus. Alternatively, the application software may be configured to be launched on the mobile communication terminal and thereafter connect the mobile communication terminal to the service server to execute the authentication process. The application software may also be configured to cause the mobile communication terminal to display an instruction button for permitting the portable charger to start charging if the service user's right to receive the charging service is valid in the authentication process.

In addition, the mobile communication terminal may transmit an instruction signal for starting charging to the portable charger after the authentication process is executed. In this case, the charging, apparatus and the portable charger may be configured to perform wireless power transfer from the charging apparatus to the portable charger based on the instruction signal received by the portable charger.

The mobile communication terminal may transmit a power transfer condition signal based on a wireless power transfer condition to the portable charger after the authentication process is executed. When this is the case, the charging apparatus and the portable charger may be configured to perform wireless power transfer from the charging apparatus to the portable charger based on a condition specified by the power transfer condition signal received by the portable charger. Additionally, the mobile communication terminal may be configured to cause a screen of the mobile communication terminal to display a charging status while the wireless power transfer is being performed from the charging apparatus to the portable charger. The mobile communication terminal may also be configured to transmit usage information based on the charging status to the service server after the wireless power transfer is complete.

The service server may be configured to perform a billing process to a service user identified by an identity verification in advance based on the usage information.

DETAILED DESCRIPTION

Hereinbelow, embodiments of a charging service system are described according to the present disclosure. It should he noted, however, that the disclosed embodiments are, of course, not intended to limit the invention. The present invention is not limited to the embodiments described herein unless specifically stated otherwise. The drawings are depicted schematically and do not necessarily reflect actual objects. The features and components that exhibit the same effects are designated by the same reference symbols as appropriate, and the description thereof will not be repeated. The terms "Wi-Fi" and "Bluetooth" in the description are registered trademarks.

The present inventors have investigated provision of a completely new charging service for mobile terminals. The rapid charging service that is investigated herein provides a service user with a portable charger incorporating a secondary battery compatible with rapid charging, which makes use of high power secondary battery technology such as used for hybrid electric vehicles. Such a secondary battery is capable of being charged at an extremely high rate, such as at 5 C or higher. Even for a battery that is portable in weight size, such a rapid charging service is able to complete charging about 25% to about 30% of the capacity of the battery incorporated in a currently commercially available smartphone within a time period of about 1 minute. A large number of dedicated charging stations that are compatible with rapid charging of secondary batteries of such type are provided in town. It is intended to achieve rapid charging of the portable charger as described above so that power transmission can be provided in short time to mobile devices such as smartphones that have insufficient charge.

The present inventors expect such type of rapid charging service for portable chargers to allow only the service users based on the contract to be able to charge their devices appropriately at the charging stations according to the agreement of use of the service. For instance, if authentication for approving the credit of the service user is required at each charging station and each time the service is used, the service user needs to communication with, for example, a payment service provider company every time, which means that the user is forced to wait until the user can start charging. As a consequence, it takes time and trouble for the user until the user can start using the service. For the portable charger rapid charging service to be offered, it is desired to improve user convenience so as to accommodate the imminent demands of power transmission from the service users with limited time, and to differentiate the service from other services. From that perspective, it is desired to introduce a system that is able to perform authentication of the service users instantly and reliably according to the agreement of use of the service.

Charging Service System 10

Figure 1:
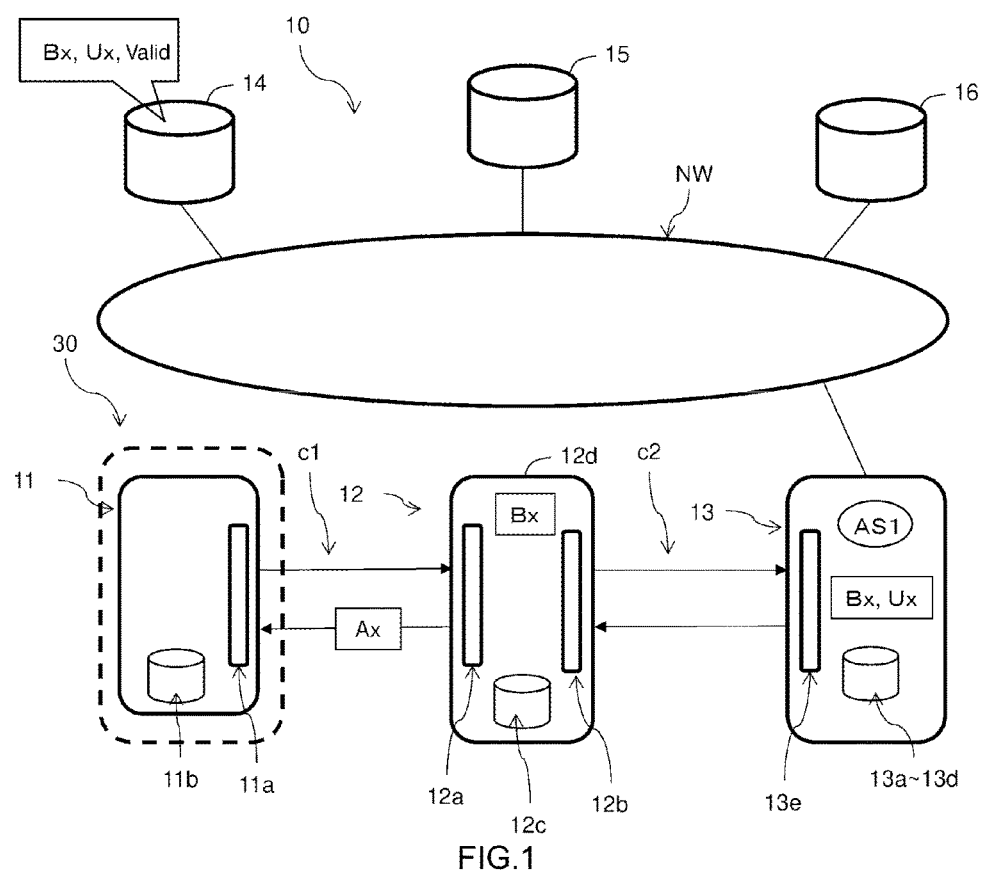
FIG. 1 is a schematic view illustrating a charging service system 10 according to the present disclosure.

FIG. 1 is a schematic view illustrating a charging service system 10 according to the present disclosure. The charging service system 10 includes a charging apparatus 11, a portable charger 12, a mobile communication terminal 13, and a service server 14. In this embodiment, the charging service allows credit card payment through a payment service provider company 15 and a credit card company 16, for example.

Charging Apparatus 11

The charging apparatus 11 includes a wireless power transfer device 11a and a controller 11b. The wireless power transfer device 11a is a device capable of wirelessly transferring electric power to the portable charger 12. The wireless power transfer device 11a may include, for example, a power transmitting coil. The controller 11b is a controller for executing various processes of the charging apparatus 11. The charging apparatus 11 may be installed, for example, at a charging station 30, which is provided in town. The charging station 30 may be provided at stores, such as bookstores and convenience stores, ticket wickets and the inside of train stations, and the like, for example. For the charging apparatus 11, it is possible to use various types of charging apparatuses, including one that can be placed on a table and one that can be placed on a floor surface. The charging apparatus 11 may be provided with, for example, a place at which the portable charger 12 to be charged can be placed in a predetermined position. The wireless power transfer device 11a may be provided so as to transfer electric power to the portable charger 12 that is placed on such a place.

Portable Charger 12

The portable charger 12 includes a wireless power receiving device 12a, a communication device 12b, and a controller 12c. The wireless power receiving device 12a is a power receiving device that corresponds to the wireless power receiving device 12a.

The communication device 12b, which is additionally built into the portable charger 12, is a communication device that is communicable with the mobile communication terminal 13. The communication device 12b built into the portable charger 12 is a device that is used mainly for communication c2 with the mobile communication terminal 13.

The controller 12c is a device for controlling various processes of the portable charger 12. Herein, the controller 11b of the charging apparatus 11 and the controller 12c of the portable charger 12 each may be implemented by, for example, a computer that is operated according to a predetermined program. Specifically, in this embodiment, each of the controller 11b of the charging apparatus 11 and the controller 12c of the portable charger 12 may be implemented by a microcomputer. The programs that are incorporated in the controller 11b and the controller 12c and the information stored therein may be configured to be rewritten by software.

The portable charger 12 possesses a preassigned battery ID as the information for identifying the battery. The battery ID is the information that uniquely identifies a battery. The battery ID may be created with information that is readable by a computer. The battery ID is indicated as "Bx" an the drawings.

The portable charger 12 is configured to be able to emit a signal Ax. The signal Ax is a predetermined signal indicating that the portable charger 12 is one that is eligible to receive the rapid charging of the charging service provided by the charging apparatus 11, in relation to the charging apparatus 11. The just-mentioned signal Ax may be configured to be updated, for example, by modifying the software incorporated in the portable charger 12. For example, the signal Ax may be rewritten periodically by an operation on the service provider side. The controller 12c may be configured to update the signal Ax based on communication between the mobile communication terminal 13 and the portable charger 12. The signal Ax may be common between different portable chargers 12. The identifier Bx, which is the battery ID, may be stored in a predetermined memory storage area in the controller 12c of the portable charger 12.

The charging apparatus 11 and the portable charger 2 may be provided with a communication function that can transmit signals and the like as appropriate. Communication c1 between the charging apparatus 11 and the portable charger 12 may be achieved by, for example, utilizing the wireless power transfer device 11a and the wireless power receiving device 12a that can transmit and receive radio waves. Each of the wireless power transfer device 11a and the wireless power receiving device 12a includes an electric coil. The wireless power transfer device 11a and the wireless power receiving device 12a may be configured to be able to transmit and receive signals by radio waves. Note that the wireless power transfer device 11a and the wireless power receiving device 12a may adopt existing technology as appropriate. Therefore, the wireless power transfer device 11a and the wireless power receiving device 12a will not be further detailed herein. The charging apparatus 11 and the portable charger 12 may be configured to be able to communicate with each other using a communication device that is provided separately from the wireless power transfer device 11a and the wireless power receiving device 12a.

Mobile Communication Terminal 13

The mobile communication terminal 13 is a portable type communication terminal that is configured to be able to communicate with the service server 14. The mobile communication terminal 13 may be, for example, a communication terminal that is connectable with a communication network NW, such as the Internet, under a mobile communication environment or a Wi-Fi communication environment. Such a mobile communication terminal 13 may also be implemented by a smartphone and a tablet terminal, for example, and also by a wearable terminal, such as a smartwatch. The mobile communication terminal 13 stores a battery ID and a user ID in association with each other. In this embodiment, the battery ID is information that identifies a portable charger 12. The user ID is information that identifies a service user. In FIG. 1, the battery ID is indicated as "Bx". The user ID is indicated as "Ux". Each of the battery ID (Bx) and the user ID (Ux) is created with information that is readable a computer.

It should be noted that possible embodiments of the mobile communication terminal 13 are not limited to the embodiments described herein. For example, the mobile communication terminal 13 may also include a memory storage device 13a that stores information, a processing device 13b that processes information, a display 13c that also serves as an operating device such as a touchscreen, and a communication device 13d that is connectable with a communication network such as the Internet. The mobile communication terminal 13 may also be, for example, a terminal that is connectable with a communication network such as the Internet through a device serving as a repeater, such as a smartphone and a portable Wi-Fi router. In addition, the mobile communication terminal 13 may be configured to be able to incorporate application software and to implement predetermined processes by the application software. The mobile communication terminal 13 can change its functions that can be implemented, depending on the incorporated application software. In this embodiment, the mobile communication terminal 13 incorporates a dedicated application software AS1 for receiving a charging service. The application software AS1 may be stored in a predetermined memory storage area in the mobile communication terminal 13.

The mobile communication terminal 13 includes a communication device 13e. The communication device 13e is a device that is configured to be communicable with the communication device 12b incorporated in the portable charger 12. The communication device 12b. Which is incorporated in the portable charger 12, and the communication device 13e, which is incorporated in the mobile communication terminal 13, can each adopt a general-purpose communication device, such as the one incorporated in the mobile communication terminal 13. The communication device 12b and the communication device 13e may conform to a communication standard that is compatible with near field communication. For the communication device 12b and the communication device 13e, it is possible to adopt, for example, a BLE module, which is compatible with the Bluetooth Low Energy (BLE) communication standard. The BLE module is a general-purpose communication device that can achieve low power consumption. The BLE module is commonly built into currently commercially available smart-phones. It should be noted that the BLE module is mentioned as an example of a communication device that can be adopted as the communication device 12b and the communication device 13e. The communication standard and the communication device that can be adapted for the communication device 12b and the communication device 13e are not limited to such an embodiment. It is possible to adopt an optimum device as appropriate according to the technological advancement in the future.

Service Server 14

The service server 14 is a server that is communicable with the mobile communication terminal 13 through the communication network NW. The service server 14 may be a cloud server that is operated and managed by a service provider offering the charging service in the charging service system 10. The service server 14 is in a condition where it can be accessed by the mobile communication terminal 13 when appropriate through the communication network NW, such as the Internet. The service server 14 is configured to perform functions according to programs.

The service server 14 stores battery IDs, user IDs, and validity of service users' right to receive the charging service in association with each other. The service server 14 is configured to execute an authentication process. In the authentication process, a battery ID and a user ID are acquired from the mobile communication terminal 13. Then, based on the acquired user ID, the service server 14 determines the validity of the service user's right to receive the charging service for the portable charger 12 that is identified by the battery ID.

The authentication process may include, as a preliminary preparation, a process in which the service server 14 stores a battery ID, a user ID, and validity of the user's right to receive the charging, service in association with each other. The process that implements such a preliminary preparation can be implemented by a cooperative process of the service server 14 and the mobile communication terminal 13 incorporating the application software AS1.

Application Software AS1

The mobile communication terminal 13 may incorporate, as a prerequisite for using the charging service proposed herein, a dedicated application software AS1 installed thereon. The application software AS1 may be obtained, for example, by the mobile communication terminal 13 through the communication network NW. The application software AS1 is configured to cause the mobile communication terminal 13 to display a predetermined registration screen the first time it is launched after the installation. The application software AS1 is a softy are that is pre-programmed to cause the mobile communication terminal 13 to implement the functions to execute the processes that are necessary to receive the charging service. The mobile communication terminal 13 may be a general purpose terminal. By installing the application software AS1 thereon, the mobile communication terminal 13 implements necessary functions to receive the charging service. In addition, the application software AS1 can be updated when appropriate.

In this embodiment, the application software AS1 is configured to connect the mobile communication terminal 13 to the service server 14 when the application software AS1 is launched on the mobile communication terminal 13. In this embodiment, the connection process causes the mobile communication terminal 13 and the service server 14 to be connected with each other so as to be capable of bidirectional communication with each other. The mobile communication terminal 13 is connected to the service server 14 through the application software AS1. For example, a registration process can be selected on an initial setting screen of the application software AS1. Alternatively, a screen for executing the charging process is displayed in the case where the pre-registration process is already complete.

The main processes of the application software AS1 include the following processes.

S1: Assigning a user ID
S2: Pairing of the portable charger 12 and the mobile communication terminal 13
S3: Associating the battery ID with the user ID
S4: Registering a payment method of the service user
S5: Charging process that is executed when the service user uses the charging service
S6: Transmitting process for sending usage information to the service server 14

Figure 2:
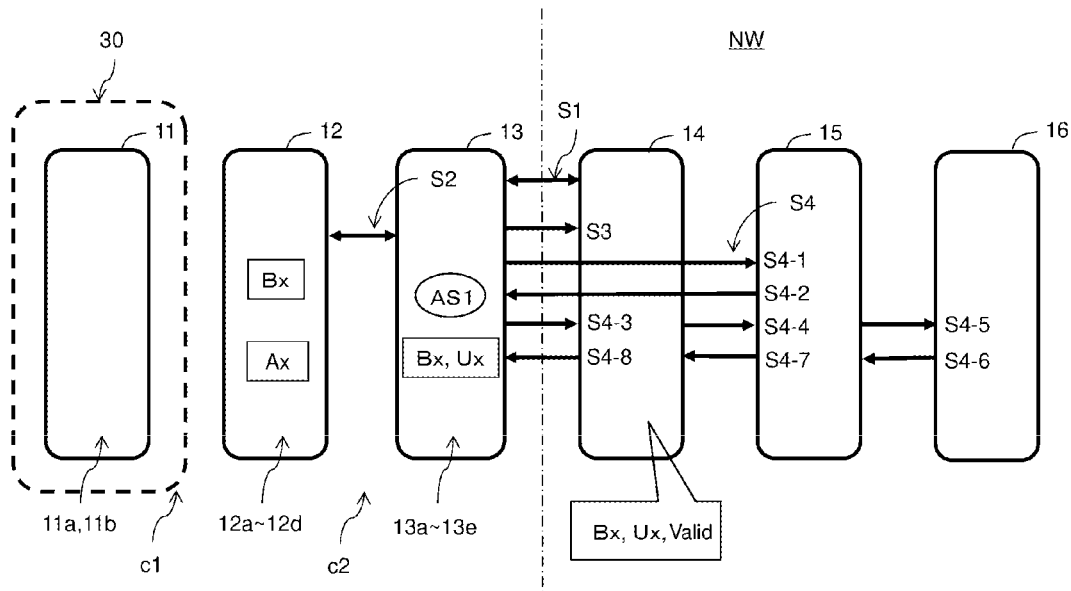
FIG. 2 is a schematic view illustrating the flow of processes S1 to S4.

FIG. 2 is a schematic view illustrating the flow of processes S1 to S4. The processes from S1 to S4 are the pre-registration process before the charging service is provided. The processes from S1 to S4 are executed, for example, in a condition where the service user has obtained a portable charger 12 and the dedicated application software AS1 has been installed on the mobile communication terminal 13.

S1: Assigning User ID

In a process S1 of assigning a user ID, the service server 14 assigns a user ID to a service user. This embodiment is configured in such a manner that personal information, such as name, birth date, mailing address, mobile phone number, and e-mail address, can be registered at a dedicated website that is provided separately. The information that is entered here is the information for identifying the service user. The entered information is transmitted to the service server 14 (S1). The information transmitted to the service server 14 is recorded as the personal information of the user. The service server 14 performs personal verification based in the entered information and issues a login ID and a password. Furthermore, based on the login ID, a payment method is registered in a process of the application software AS1, which allows the user to become a service subscriber and allows a user ID (Ux) to be assigned to the user. The assigned user ID (Ux) may be stored in the service server 14 in association with the login ID, the registered payment method, and other information.

Herein, the process from the issuance of the login ID to the assignment of the user ID may be carried out in the following manner, for example. The service server 14 sends a notification to the e-mail address registered at the dedicated website to notify a website dedicated for setting up a login ID and a password. The service server 14 may be configured in such a manner that a unique login ID and a password are issued at the website according to the entries input by the user. The login ID and the password issued here are stored in the service server 14 in association with the personal information of the user. The login ID and the password are used in the cooperative processes of the service server 14 and the mobile communication terminal 13 as the login information for the applications of the mobile communication terminal 13. Furthermore, it is possible that the user may log in the applications based on the login ID and a user ID (Ux) may be assigned to the user by a cooperative process of the service server 14 and the mobile communication terminal 13. The login ID and the user ID may be determined so that they are not duplicated between the service users of the charging service. For the login ID, it is possible to associate and use an ID that has been used in an existing online platform.

S2: Pairing of Portable Charger 12 and Mobile Communication Terminal 13

A pairing process S2 is a process in which the mobile communication terminal 13 associates a portable charger 12 with the mobile communication terminal 13 (S2).

This embodiment may be configured in such a manner that, by a function of the application software AS1, the mobile communication terminal 13 acquires the battery ID (Bx) from the portable charger 12 and stores the battery ID and the user ID in association with each other. For example, the pairing process S2 may be configured in such a manner that the mobile communication terminal 13 may recognize and store the battery ID (Bx) of the portable charger 12 when the mobile communication terminal 13 recognizes the portable charger 12 by BLE communication.

For example, the application software AS1 may be configured so that a request signal requesting the battery ID is transmitted from the mobile communication terminal 13 to the portable charger 12 when the mobile communication terminal 13 is connected to the portable charger 12 via BLE communication. The portable charger 12 may be configured to transmit the battery ID in response to the request signal from the mobile communication terminal 13.

In another embodiment, the battery ID may be recorded in a two-dimensional barcode attached to the portable charger 12 or a package of the portable charger 12. When this is the case, the two-dimensional barcode may be acquired by reading the two-dimensional barcode with the mobile communication terminal 13. It is possible that the mobile communication terminal 13 may be connected by BLE communication to a portable charger 12 that has been paired therewith in advance. It is possible that one mobile communication terminal 13 may be paired with a plurality of portable chargers 12. When one mobile communication terminal 13 is paired with a plurality of portable chargers 12, the application software AS1 may be configured to select one portable charger 12 from among the plurality of portable chargers 12 as appropriate by a function of the application software AS1.

S3: Associating Battery ID with User ID

In this embodiment, the battery ID and the user ID are transmitted from the mobile communication terminal 13 to the service server 14 by a function of the application software AS1. The service server 14 associates the battery ID and the user ID with each other and records them into a predetermined memory storage area in the service server 14 (S3).

S4: Registering a Payment Method of the Service User

A process of registering a payment method of the service user enables registration of a payment method of the service user. In the process of registering a payment method, it is possible to select a credit card payment, for example. When a credit card payment is selected, the credit of the service user is checked through a payment service provider company 15 or a credit card company 16. In this case, the entered information such as the credit card number and the expiration date are encrypted and sent from the mobile communication terminal 13 to the payment service provider company 15 (S4-1). The payment service provider company 15 transmits encrypted in that is called digital token to the mobile communication terminal 13 (S4-2). Next, the digital token is transmitted from the mobile communication terminal 13 to the service server 14 (S4-3). The service server 14 associates the received digital token with information for an authorization process on the payment method of the service user, and transmits the information along with the digital token to the payment service provider company 15 (S4-4). Based on the digital token, the payment service provider company 15 transmits the information on the payment method of the service user to the credit card company 16 and submits a request for credit authorization (so-called authorization) to the credit card company 16 (S4-5), Based on the digital token, the payment service provider company 15 decrypts the encrypted information that has been sent from the mobile communication terminal 13, such as the credit card number and the expiration date. Then, the payment service provider company 15 replaces the digital token with the credit card number, expiration date, and other information, then transmits the credit information to the credit card company 16, and requests credit authorization (S4-5). The credit card company 16 determines credit worthiness based on the credit card number and expiration date that are received from the payment service provider company 15, and returns the result of the determination on the credit worthiness to the payment service provider company 15 (S4-6). As a result of the credit worthiness determination process, the result of the credit worthiness determination is returned from the payment service provider company 15 to the service server 14 (S4-7). Furthermore, the service server 14 returns the approval of the payment method to the mobile communication terminal 13 (S4-8). The processes S4-5 to S4-8 allow the service server 14 to receive only the encrypted digital token from the mobile communication terminal 13 without receiving any information such as the actual credit card number and expiration date when making a credit authorization request to the credit card company 16 through the payment service provider company 15.

At this time, if it is determined that the payment is not acceptable (authorization declined), a function of the application software AS1 asks the service user to re-enter the information such as the credit card number and expiration date. If it is determined that the payment can be authorized (authorization accepted), the registration of the payment method of the service user is complete in the service server 14. If it is determined that the payment is acceptable (authorization accepted), the service server 14 sets the validity of the right of the service user identified by the user ID to receive the charging service to be valid (valid), as illustrated in FIG. 1. The service server 14 stores the battery ID (Bx), the user ID (Ux), and the validity of the service user's right to receive the charging service (valid) in association with each other. Such a digital token payment technique can be employed for the credit authorization determination for the credit card payment and other processes. The digital token payment is a known technique and therefore will not be further detailed herein. In addition, for the credit authorization determination for the credit card payment or other processes, it is possible to adopt various techniques that may be adopted in E-commerce services. Moreover, the service user may select such a service that the charging service can be used for an unlimited number of times within a predetermined period of use, such as monthly or yearly.

Although the credit card payment is described herein as an example, the payment method is not limited, to the credit card payment. For example, it is also possible that the communication service provider of the mobile communication terminal 13 associated with the user ID may also he involved in the payment process so that the usage fee of the charging service system is added to the monthly usage fee of the mobile communication terminal 13. Thus, the service user is allowed to adopt not only the credit card payment but also various other payment methods.

Every predetermined period of use, the service server 14 checks as appropriate if the payment method of the service user is valid during that period. The service server 14 may receive the result of credit authorization determination from the payment service provider company 15 as appropriate. For example, when the contract of the service user is such that the contract is automatically renewed on a monthly basis, the service server 14 may be configured to determine whether or not the contract of the user is valid at every time of renewal. For example, when the contract is renewed, the service server 14 may execute the processes S4-5 to S4-8, which utilizes a digital token, from among the above-described techniques. As a result of the processes S4-5 to S4-8, the service server 14 is able to continuously determine the validity of the service user's right to receive the charging service appropriately utilizing a digital token without receiving any actual credit card number, expiration date, or other information. If the service user's right to receive the charging service is valid, the service server 14 maintains the condition in which it stores the battery ID (Bx), the user ID (Ux), and the validity (valid) of the right of the service user identified by the user ID to receive the charging service, in association with each other. If the service user's right to receive the charging service is not valid, the service server 14 may set the validity of the right of the service user identified by the user ID to receive the charging service to be void (invalid), and may associate such information with the battery ID (Bx) and the user ID.

Thus, in the charging service system 10 provided herein, the mobile communication terminal 13 incorporates the dedicated application software AS1, as illustrated in FIG. 1. The service user is registered in advance, and a user ID is assigned to the service user. The application software AS1 allows the mobile communication terminal 13 to acquire the batter ID of the portable charger 12 owned by the service user and to store the battery ID and the user ID in association with each other. Furthermore, a function of the application software AS1 serves to register the payment method of the service user for using the charging service, in this embodiment, a function of the application software AS1 allows the service user and the service provider altering the charging service to enter into an agreement of use of the charging service online. The service user possesses the right to charge the portable charger 12 owned by the service user using the charging apparatus 11 provided at the charging station 30, according to the agreement. The service provider offering the charging service operates the service server 14. The service server 14 stores the battery ID, the user ID, and the validity of the right of the service user identified by the user ID to receive the charging service, in association with each other. The above-described processes S1 to S4 achieve such a condition of the mobile communication terminal 13 owned by the service user and the service server 14 operated by the service provider.

Figure 3:
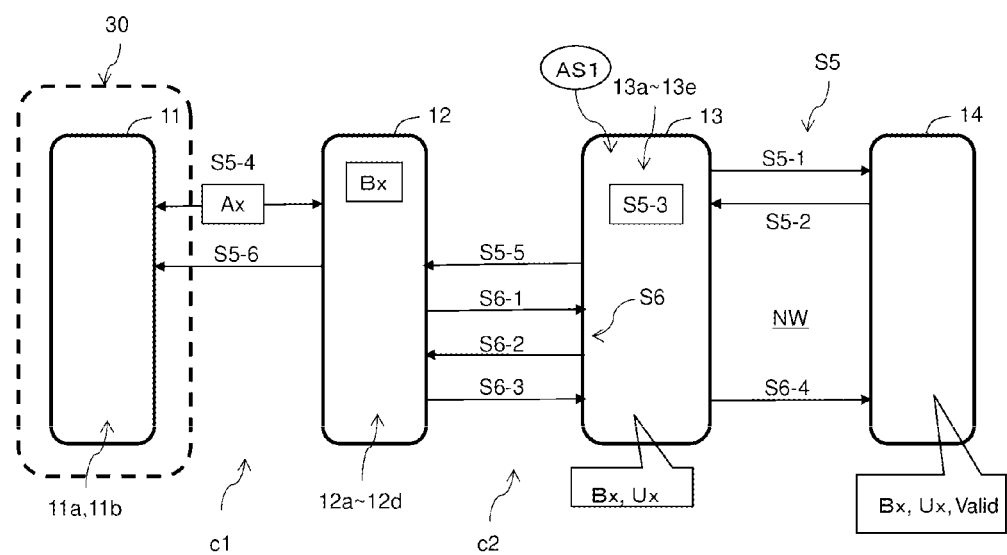
FIG. 3 is a schematic view illustrating the flow of processes S5 and S6.

The following describes an example of the process in which a service user receives the charging service. FIG. 3 is a schematic view illustrating the flow of processes S5 and S6. For convenience, it is assumed that the service user and the service provider have the right to charge the portable charger 12 owned by the service user using the charging apparatus 11 provided at the charging station 30. It is also assumed that the contract is such that the service user is billed on a monthly basis by the service provider and the fee is deducted from a pre-registered credit card of the service user. It is also assumed that the contract is automatically renewed unless there is a specific reason for terminating the contract. It is also assumed that the information on the validity of the service user's right to receive the charging service is renewed monthly in accordance with the contract.

S5: S5: Charging Process That Is Executed When the Service User Uses Charging Service In this charging service system, the rapid charging with the charging apparatus 11 placed at the charging station 30 allows the portable charger to be charged a capacity of about 25% SOC within a significantly short time, about 1 minute. The present inventors believe that, for such a charging service system capable of very rapid charging, there is potentially a high demand of service users that the service users desire to recover the charge level of the portable charger 12 rapidly when the portable charger 12 has no remaining capacity or a low level of remaining capacity. In order to meet such a demand of service users, the present inventors believe that it is desirable to reduce the waiting time until the start of charging and the effort of the service users, in addition to ensuring the reliability of authentication from, the viewpoint of improving the convenience.

Under such circumstances, in this embodiment, when the service user uses the rapid charging, at first, the service user launches the dedicated application software AS1, which is built into the mobile communication terminal 13. When the application software AS1 is launched, the application software AS1 checks whether or not the mobile communication terminal 13 and the portable charger 12 are connected via BLE communication. If the mobile communication terminal 13 and the portable charger 12 are connected via BLE communication, the application software AS1 acquires the battery ID of the portable charger 12. Then, the application software AS1 determines whether or not the acquired battery ID is the battery ID that is pre-associated with the user ID in the mobile communication terminal 13. If the battery ID is the one that is pre-associated with the user ID, the application software AS1 causes the mobile communication terminal 13 and the service server 14 to connect with each other through the communication network NW. In this embodiment, when BEE communication is ON in the mobile communication terminal 13, the portable charger 12 and the mobile communication terminal 13 are able to communicate with each other via BLE communication, irrespective of whether the application software AS1 has been launched or not.

When the mobile communication terminal 13 is connected to the service server 14, an authentication process is executed. Herein, the authentication process is a process of determining the validity of the service user's right to receive the charging service for the portable charger 12. In the authentication process, the service server 14 acquires the battery ID and the user ID from the mobile communication terminal 13 at first. The service server 14 executes the process of determining the validity of the service user's right to receive the charging service for the portable charger 12 that is identified by the battery ID based on the user ID. In this embodiment, the authentication process is executed by a cooperative process between the service server 14 and the mobile communication terminal 13, in which the application software AS1 is incorporated.

As illustrated in FIG. 3, the service server 14 acquires the battery ID and the user ID from the mobile communication terminal 13 (S5-1). The service server 14 verifies the user ID and the validity of the service user's right to receive the charging service based on the pre-associated information stored in the service server 14. The service server 14 transmits the determination result about the validity of the service user's right to receive the charging service to the mobile communication terminal 13 (S5-2).

The mobile communication terminal 13 may be configured to execute a predetermined process (S5-3) if the service user's right to receive the charging service is valid. In this embodiment, the charging apparatus 11 and the portable charger 12 are configured to be able to detect that the portable charger 12 is placed appropriately on the charging apparatus 11 by communication between the wireless power transfer device 11a and the wireless power receiving device 12a (S5-4). The charging apparatus 11 may be configured to confirm that the portable charger 12 is a compatible product that is compatible with the rapid charging of the charging apparatus 11.

Whether the portable charger 12 is placed on the charging, apparatus 11 such a condition as to be charged or not can be detected by, for example, communication between the wireless power transfer device 11a and the wireless power receiving device 12a. In addition, the mobile communication terminal 13 can detect such a condition by communication with the portable charger 12. The portable charger 12 may be configured to be operated by the mobile communication terminal 13 via BLE communication.

In this embodiment, the controller 12c of the portable charger 12 may be configured to emit a predetermined signal Ax to the charging apparatus 11 when the portable charger 12 is placed on the charging apparatus 11, as illustrated in FIGS. 1 and 3.

For example, the controller 11b of the charging apparatus 11 may transmit a signal for requesting the portable charger 12 to emit the signal Ax, which is carried on a weak radio wave, from the wireless power transfer device 11a. When placed on the charging apparatus 11 in such a condition as to be charged, the portable charger 12 is able to receive such a weak radio wave. The portable charger 12 may be configured to transmit the signal Ax from the wireless power receiving device 12a when receiving the weak radio wave. The transmitted signal Ax is detected by the charging apparatus 11 by communication between the wireless power transfer device 11a and the wireless power receiving device 12a. By receiving the signal Ax, the controller 11b of the charging apparatus 11 can recognize that the portable charger 12 placed on the charging apparatus 11 is a portable charger 12 that is compatible with the charging apparatus 11. In addition, the controller 12c of the portable charger 12 is also able to detect that the charging apparatus 11 has received the signal Ax. It is also possible that, when the portable charger 12 is not placed appropriately on the charging apparatus 11, the controller 12c of the portable charger 12 may send a predetermined signal to cause the mobile communication terminal 13 to display an indication screen that prompts the service user to make an adjustment such that the portable charger 12 can be placed appropriately on the charging apparatus 11.

Thus, it is possible to detect that the portable charger 12 has been placed appropriately on the charging apparatus 11 by communication between the wireless power transfer device 11*a* and the wireless power receiving device 12*a*. The signal Ax may be a signal for verifying that the portable charger 12 is a dedicated portable charger 12 provided by the charging service. In other words, this charging service is one that achieves rapid charging, so the wireless power transfer device 11*a* outputs a high power. For this reason, it is confirmed, by communication between the charging apparatus 11 and the portable charger 12, that the portable charger 12 is compatible with such high power. When the controller 12*c* of the portable charger 12 confirms reception of the signal Ax by communication between the charging apparatus 11 and the portable charger 12, the controller 12*c* of the portable charger 12 transmits, to the mobile communication terminal 13, a signal indicating that the portable charger 12 is placed on charging apparatus 11.

For example, when the portable charger 12 is not placed on the charging apparatus 11, it is possible that the mobile communication terminal 13 may display an indication screen that prompts the service user to place the portable charger 12 on the charging apparatus 11. When the mobile communication terminal 13 detects that the portable charger 12 has been placed on the charging apparatus 11 by communication with the portable charger 12, the mobile communication terminal 13 may display a Start Charging button. The Start Charging button is a button for instructing the portable charger 12 to start charging.

Thus, in this charging service system, the service server 14 stores the battery ID, the user ID, and the validity of the right of the service user identified by the user ID to receive the charging service in association with each other. As a result, the service server 14 is able to determine the validity of the service user's right to receive the charging service for the portable charger 12 owned by the service user. The process for determining the validity of the service user's right to receive the charging service is completed by the mobile communication terminal 13 and the service server 14. The time from when the application software AS1 is started until the charging service is provided is remarkably reduced.

The mobile communication terminal 13 may be configured to be allowed to send a start charging signal to a portable charger 12 identified by the battery ID (S5-5) if the service user's right to receive the charging service is valid. Such a function may be incorporated in the application software AS1. Here, whether the service user's right to receive the charging service is valid or not may be determined based on the result of the determination made by the service server 14 that determines the validity of the service user's right to receive the charging service. Charging may be started between the charging apparatus 11 and the portable charger 12 when the start charging signal is sent to the portable charger 12 while the portable charger 12 is placed on the charging apparatus 11 in such a condition as to be charged. Thus, it is possible that the start of charging may be controlled with the mobile communication terminal 13 when the service user's right to receive the charging service is valid.

In another embodiment, the mobile communication terminal 13 may be configured to acquire the battery ID from the service server 14 and to be able to send the start charging signal to the portable charger 12 identified by the battery ID stored in the service server 14 (S5-5) if the service user's right to receive the charging service is valid. Such a function can be implemented by the application software AS1. The battery ID may be sent back from the service server 14 to the mobile communication terminal 13 according to the determination result for the validity. It is possible that the application software AS1 causes the mobile communication terminal 13 to display the Start Charging button for charging the portable charger 12 identified by the battery ID. In this case, when the start charging button is pressed, the start charging signal is sent to the portable charger 12 identified by the battery ID. This means that, when the portable charger 12 identified by the battery ID that is associated by the service server 14 is not placed on the charging apparatus 11, charging is not started. As a result, charging is permitted only for the portable charger 12 that is associated with the user ID of the user and the validity of the user's right. In this case, it is possible to specifically identify the portable charger 12 the service user is allowed to charge in cooperation with the service server 14.

In the mobile communication terminal 13, the battery ID and the user ID are associated with each other by application software AS1. In the service server 14, the battery ID, the user ID, and the validity of service user's right to receive the charging service are associated with each other. The service server 14 acquires the battery ID and the user ID from the mobile communication terminal 13 and execute an authentication process of determining the validity of the service user's right to receive the charging service for the portable charger 12 that is identified by the acquired battery ID based on the acquired user ID. Therefore, even when a third person accidentally picks up the portable charger 12 identified by the battery ID and attempts to charge the portable charger 12 using the application software AS1 installed on the third person's mobile communication terminal 13, the portable charger 12 cannot be charged unless the battery ID and the user ID are associated with each other in the service server 14. Thus, a third person is not allowed to use another person's portable charger 12. It is possible to employ a configuration to restrict the usage of the service offered in this way.

Note that in the service server 14 the battery ID, the user ID, and the validity of service user's right to receive the charging service are associated with each other. It is also possible that the service server 14 may associate a plurality of battery IDs with a user ID. In this case, by a process on the application software AS1 of the mobile communication terminal 13, the service user may be allowed to select one of a plurality of portable chargers 12 that are associated with the user ID. Then, the battery ID of the selected one of the portable chargers 12 and the user ID may be transmitted to the service server 14, and the service server 14 may be configured to determine the validity of the service user's right to receive the charging service. In this case, charging is started when the portable charger 12 selected by the mobile communication terminal 13 is placed on the charging apparatus 11. In this way, a plurality of the battery IDs may be associated with a user ID. Charging is started if the portable charger 12 that is identified by the battery ID associated with the user ID is placed on the charging apparatus 11.

The application software AS1 may be configured to be launched on the mobile communication terminal 13 and to execute an authentication process when the mobile communication terminal 13 is connected to the service server 14. For example, the service user may launch the application software AS1 before the service user arrives at the charging station 30. In the above-described configuration, when the application software AS1 is launched, the mobile communication terminal 13 is brought into a stand-by state with the authentication process completed without requiring any action of the service user. This allows the service user to start charging smoothly as soon as the service user arrives at the charging station 30.

The application software AS1 may be configured to cause the mobile communication terminal 13 to display a map screen so as to show charging stations 30 that are close to the service user on the map screen. This makes it possible to guide the service user to a charging station 30 that is close to the service user. Also, the service user may be able to select and use a charging station 30 that is convenient for the service user along the route the service user is travelling. Furthermore, the application software AS1 may also be configured to cause the mobile communication terminal 13 to guide the route to the charging station 30 selected by the service user on the map screen.

Moreover, in cases where the portable charger 12 is not placed on the charging apparatus 11, the mobile communication terminal 13 may execute a report process of prompting the service user to place the portable charger 12 onto the charging apparatus 11 if the service user's right to receive the charging service is valid. As a result, the service user is notified that the authentication process has been complete, so the service user can smoothly take the next action, i.e., place the portable charger 12 on the charging apparatus 11. It is expected that this serves to reduce the time before starting charging. For example, the mobile communication terminal 13 may display a message such as "place your portable charger on a charging apparatus".

Such a process may also be incorporated into the application software AS1 as one of its functions. In this case, the service user may place the portable charger 12 that is connected to the mobile communication terminal 13 via BLE communication according to the process of the application software AS1. The application software AS1 may inform the service user of the portable charger 12 that is connected to the mobile communication terminal 13 via BLE communication. For example, if a predetermined name is given to the portable charger 12, the name may be displayed on the mobile communication terminal 13. As a result, the service user is able to recognize that the portable charger 12 is connected to the mobile communication terminal 13 via BLE communication. Moreover, even when the service user owns a plurality of portable chargers 13, the service user is able to easily identify which one of the portable chargers 12 should be placed on the charging apparatus 11.

Herein, although it has been described that the application software AS1 is launched on the mobile communication terminal 13 by the service user, such an embodiment is merely exemplary. The application software AS1 may be configured to be launched on the mobile communication terminal 13 when the portable charger 12 is detected to be placed on the charging apparatus 11.

As described above, the portable charger 12 and the charging apparatus 11 at the charging station 30 are configured so that the wireless power transfer device 11a and the wireless power receiving device 12a are allowed to be communicable with each other when the portable charger 12 is placed onto the charging apparatus 11. The portable charger 12 is connected to the mobile communication terminal 13 via BLE communication. Therefore, it is possible to detect that the portable charger 12 is placed on the charging apparatus 11 based on the signal obtained by the wireless power receiving device 12a. The controller 12c of the portable charger 12 may be configured to send a predetermined signal to the mobile communication terminal 13 based on such detection. The launch conditions of the application software AS1 may be programmed so that the application software AS1 is launched when the mobile communication terminal 13 receives a predetermined signal. Thus, the application software AS1 may be configured to be launched on the mobile communication terminal 13 owned by the service user when the service user places the portable charger 12 on the charging apparatus 11.

Furthermore, the application software AS1 may be configured to connect the mobile communication terminal 13 to the service server 14 after having been launched, to execute the authentication process as described above. The mobile communication terminal 13 may be configured to display an instruction button for starting charging of the portable charger 12 from the charging apparatus 11 when the authentication process is executed. When such an instruction button is pressed, the mobile communication terminal 13 sends an instruction signal for starting charging to the portable charger 12 via BLE communication. The controller 12c of the portable charger 12 may be configured to start charging of the portable charger 12 from the charging apparatus 11 in cooperation with the controller 11b of the charging apparatus 11, upon receiving such an instruction signal. Such a configuration serves to simplify the actions to be taken by the service user after the application software AS1 has been launched. Specifically when the application software AS1 is configured to be launched as a result of placing the mobile communication terminal 13 on the charging apparatus 11, the service user can start charging in two steps, placing the mobile communication terminal 13 on the charging apparatus 11 and pressing the Start Charging button displayed on the mobile communication terminal 13. Thus, it is possible to significantly simplify the actions required for the service user to start charging.

On starting charging, a display screen for monitoring the charging status may be displayed on the mobile communication terminal 13. During charging, the mobile communication terminal 13 may display a screen for warning the service user not to move the portable charger 12. During charging, the mobile communication terminal 13 may display a stop button to stop charging on the screen. The mobile communication terminal 13 may be configured to transmit a signal for stopping charging, to the portable charger 12 when the stop button is pressed.

Thus, the mobile communication terminal 13 may be configured to transmit an instruction signal for starting charging to the portable charger 12 (S5-6) after the authentication process is executed, as illustrated in FIG. 3. Also, the charging apparatus 11 and the portable charger 12 may be configured to perform wireless power transfer from the charging apparatus 11 to the portable charger 12 based on the instruction signal for starting charging, which is received by the portable charger 12.

In this case, the authentication of the service user based on the use ID, including the validity of the service user's right to receive the charging service, is processed by the mobile communication terminal 13 and the service server 14 in combination. After the authentication process is executed, an instruction signal for starting charging is transmitted to the portable charger 12. Between the charging apparatus 11 and the portable charger 12, the portable charger 12 is identified to be a dedicated portable charger 12 by receiving the signal Ax emitted by the dedicated portable charger 12. The charging apparatus 11 transmits electric power based on the instruction signal for staring charging, which is transmitted from the mobile communication terminal 13 to the portable charger 12 based on the authentication process.

In this embodiment, the instruction signal for starting charging is sent to the portable charger 12 identified by the battery ID that is associated with the user ID after the authentication process is performed. Based on such an instruction signal for starting charging, the wireless power receiving device 12a of the portable charger 12 is opened to start charging using the wireless power transfer device 11a and the wireless power receiving device 12a. That is, controlling is performed so that a relay for starting charging is turned on between the wireless power transfer device 11a and the wireless power receiving device 12a.

In such an embodiment, the charging apparatus 11 and the portable charger 12 perform wireless power transfer from the charging apparatus 11 to the portable charger 12 based on the instruction signal received by the portable charger 12. Charging from the charging apparatus 11 to the portable charger 12 is not performed for any other portable chargers other than the portable charger 12 that is identified by the battery ID associated with the authenticated user ID. Also, the charging service can be provided based on a contract between the service user and the service provider offering the charging. In this case, the charging apparatus 11 does not particularly need to communicate with the service server 14 or the mobile communication terminal 13. Also, no authentication process is required between the service server 14 and the mobile communication terminal 13. Therefore, charging is started quickly after the instruction signal for starting charging is transmitted to the portable charger 12. Furthermore, the charging apparatus 11 does not require any device for communicating with the service server 14 or the mobile communication terminal 13. This serves to reduce the cost of components of the charging apparatus 11.

In another embodiment, the mobile communication terminal 13 may be configured to transmit a power transfer condition signal based on the condition of wireless power transfer to the portable charger 12 after the authentication process is executed. The charging apparatus 11 and the portable charger 12 may be configured to perform wireless power transfer from the charging apparatus 11 to the portable charger 12 based on the condition specified by the power transfer condition signal received by the portable charger 12.

Here, the conditions of wireless power transfer may be set so as to he selected as desired from predetermined conditions. Examples include: those in which the condition is set by charging time, such as a 1-minute rapid charging, as 2-minute rapid charging, and a 3-minute rapid charging; and those in which the condition is set b the state of charge of portable charger 12, such as charging to 25% SOC of the portable charger 12 and charging to 50% SOC of the portable charger 12. The conditions of wireless power transfer may be set, for example, by the mobile communication terminal 13 using the application software AS1 of the mobile communication terminal 13. Because the conditions of wireless power transfer can be set flexibly in this way, it is possible to achieve charging according to the amount of time for which the service user stays at the charging station 30 or the required amount of charging.

Even when the conditions of wireless power transfer is set, the service user is allowed to remove the portable charger 12 from the charging apparatus 11 to end the charging as appropriate. In this case, when the portable charger 12 is removed from the charging apparatus 11, communication between the charging apparatus 11 and the portable charger 12, i.e., communication between the wireless power transfer device 11a and the wireless power receiving device 12a is interrupted. Because the mobile communication terminal 13 and the portable charger 12 communicate with each other via BLE communication, the mobile communication terminal 13 can detect that the mobile communication terminal 13 has been removed from the charging apparatus 11 and the charging has been ended.

The mobile communication terminal 13 may be configured to cause the screen of the mobile communication terminal 13 to display a charging status while the wireless power transfer is being performed from the charging apparatus 11 to the portable charger 12. Such a configuration enables the service user to monitor the charging status from the charging apparatus 11 to the portable charger 12 through the mobile communication terminal 13. In addition, such a configuration may be implemented by the application software AS1 incorporated in the mobile communication terminal 13.

S6: Transmitting Process for Sending Usage Information to Service Server 14

Usage history and other information of the charging service used by the service user may be transmitted to the service server 14 when appropriate. In the embodiment shown in FIG. 3, the mobile communication terminal 13 may be configured to transmit usage information based on the charging status to the service server 14 after the wireless power transfer is completed. The usage information based on the charging status may include, for example, information identifying the charging apparatus 11, which is assigned to the charging apparatus 11, user ID, battery ID, amount of charging, and charging time (time of use). For example, as illustrated in FIG. 3, the portable charger 12 transmits a predetermined signal indicating the end of charging to the mobile communication terminal 13 when the wireless power transfer is completed (S6-1). Upon receiving the signal indicating the end of charging, the mobile communication terminal 13 requests the portable charger 12 to send the usage information based on the charging status (S6-2). In response to the request from the mobile communication terminal 13, the portable charger 12 transmits the usage information based on the charging status to the mobile communication terminal 13 (S6-3). Furthermore, based on such communication with the mobile communication terminal 13, the mobile communication terminal 13 transmits the usage information based on the charging status to the service server 14 (S6-4). The mobile communication terminal 13 may be configured to execute such a process using the application software AS1. By executing such a process, the service server 14 is able to collect the information on the usage of the charging service. Furthermore, the collected information can be utilized as big data.

It is also possible that the service user may use the charging service by using post-payment. In this case, the service server 14 may be configured to perform a billing process to a service user identified by an identity verification in advance based on the usage information. The billing process may be configured so that the credit card that has been registered when registering the user ID is billed. Alternatively, the billing process may be configured so that the bill is added to the monthly usage fee of the mobile communication terminal 13 that is associated with the user ID. Thus, the service user is allowed to adopt not only the credit card payment but also various other payment methods.

Figure 4:
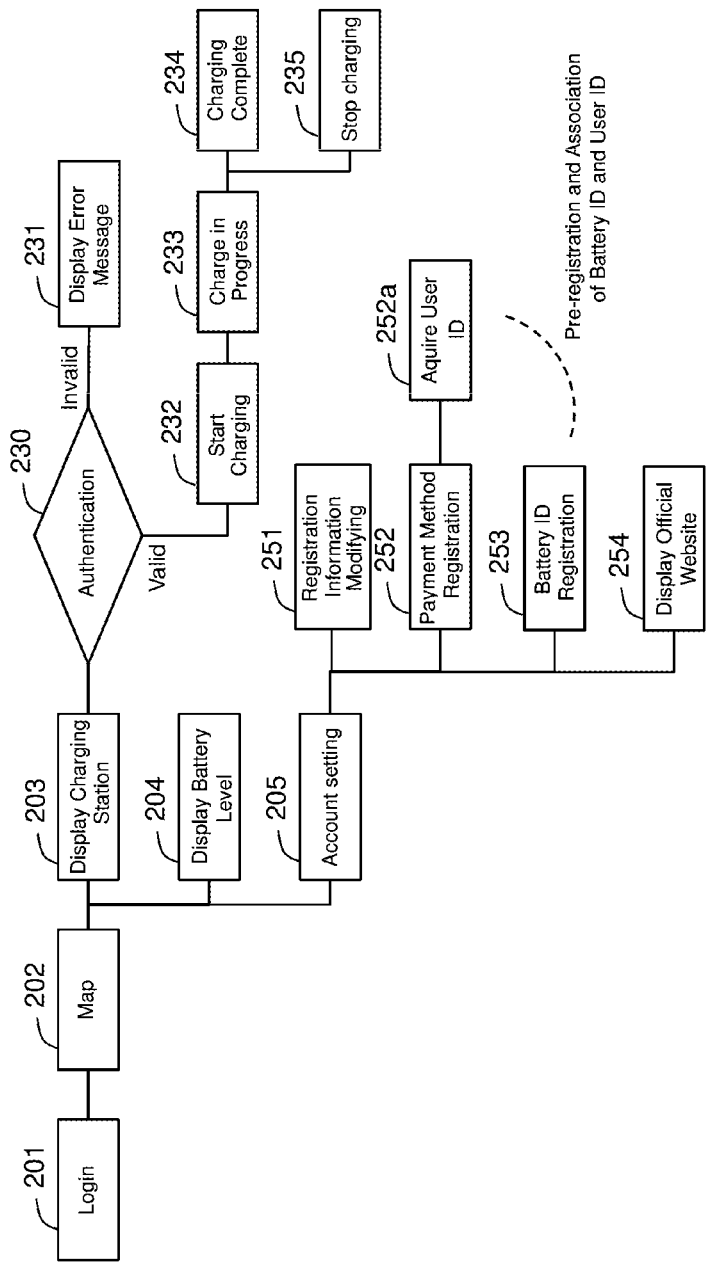
FIG. 4 is a configuration diagram illustrating an example of the configuration of screens displayed on a mobile communication terminal 13 by an application software AS1.

FIG. 4 is a configuration diagram illustrating an example of the configuration of screens displayed on a mobile communication terminal 13 by an application softwareAS1. The application software AS1 may pre-store screen images each designed to be a user interface. The application software AS1 may be configured to cause a display of the mobile communication terminal 13 to show a screen image prepared as appropriate. In the following description about FIG. 4, reference may be made to FIGS. 1 to 3 when describing the configuration of the system.

In the embodiment shown in FIG. 4, the application software AS1 causes the mobile communication terminal 13 to display a login screen 201 after having been launched. The login screen 201 may be configured so as to allow the service user to enter the login ID and the password. The entered login ID and password is verified against the information stored in the application software AS1 in the mobile communication terminal 13. If the login ID or the password does not match the stored information, the service user may be asked to re-enter the login ID and the password in the login screen 201. If the entered login ID and password are proper, a map screen 202 displaying charging stations on a map is shown on the display.

The map screen 202 displays the locations of charging stations on a map of the surrounding area based on positional information acquired by the mobile communication terminal 13. This enables the user to move to a charging station smoothly. In addition, the map screen 202 incorporates respective buttons for displaying a charging station screen 203, a remaining, battery level display screen 204, and an account setting screen 205. Each of the charging station screen 203, the remaining battery level display screen 204, and the account setting screen 205 is configured so as to be able to return to the map screen 202. Among them, the remaining battery level display screen 204 may be configured to so as to cause the mobile communication terminal 13 to display the remaining battery level of the portable charger 12 that is associated with the mobile communication terminal 13 in the application software AS1 and is connected to the mobile communication terminal 13 via BLE communication.

The charging station screen 203 is an operation screen for the charging station that has been selected on the map screen 202. The charging station screen 303 may also be configured so that the charging station selected on the map screen 202 can be obtained therein. The charging station screen 203 is configured to transmit the information of the user ID and the battery M to the service server 14 and to execute a process 230 in which the determination on the validity is performed. If the association between the user ID and the battery ID or the validity is determined to be void (invalid) in the process 230, an error message 231 is displayed. The charging station screen 203 may be configured so as to return to the charging station screen 203 if the error message 231 is displayed.

If the association between the user ID and the battery ID and the validity are determined to be valid (valid) in the process 230, a Start Charging screen 232 displayed. The Start Charging screen 232 may incorporate a Start Charging button. When the Start Charging button is pressed, the start charging signal is sent to the portable charger 12 possessing the battery ID associated with the user ID to start charging between the charging apparatus 11 and the portable charger 12. When charging is started, the application software AS1 causes the mobile communication terminal 13 to display a charge-in-progress screen 233. The charge-in-progress screen 233 may display, for example, an alarm indicating the service user not to move the portable charger 12 from the charging apparatus 11. In addition, the charge-in-progress screen 233 may be designed to allow the service user to know the charge level during charging, the remaining time until the end of charging, the changes of the remaining battery level of the portable charger 12, and the like. When charging is complete, a charging complete screen 234 is displayed.

The charge-in-progress screen 234 may be configured to indicate removal of the portable charger 12 from the charging apparatus 11. From the charging complete screen 234, it is possible to move to, for example, the remaining battery level display screen 204. When the portable charger 12 is removed from the charging apparatus 11 while the charge-in-progress screen 233 is being: displayed, a stop charging screen 235 is displayed. The stop charging screen 235 indicates that charging has been interrupted in the middle of charging. It is also possible that the charge-in-progress screen 233 may incorporate a stop charging button for interrupting charging. In this case, when the stop charging button is operated, a signal is transmitted from the mobile communication terminal 13 to the portable charger 12 to stop charging, and electric power transmission from the charging apparatus 1 to the portable charger 12 is stopped by control through the portable charger 12. From the stop charging screen 235, it is possible to move to, for example, the charging station screen 203. It is also possible that the stop charging screen 235 may incorporate a button for restarting charging.

The account setting screen 205 is a display screen for setting and modifying the user account information. In the embodiment shown in FIG. 4, a registration information modifying screen 251, a payment method registration screen 252, a battery ID registration screen 253, and an official website display screen 254 are provided.

The registration information modifying screen 251 is used to modify the registration information by a cooperative process with the service server 14. For example, the registration information modifying screen 251 may be configured to be able to modify the information associated with the user ID, such as the mailing address and e-mail address of the user.

The payment method registration screen 252 is used to execute a payment method registration process by a cooperative process with the service server 14. Here, the previously-described credit authorization process (so-called authorization) by the credit card company 16 through the payment service provider company 15 using the digital token and the like is performed. Then, when the payment method registration process is complete first in the initial setting, the user ID is acquired, and a screen 252a indicating that the user ID has been acquired is displayed.

The battery ID registration screen 253 is used to register the battery ID of the portable charger 12. The screen 253 may be configured so that the battery ID is read from the portable charger 12 via BLE communication and is registered after the user authentication. The battery ID registration screen 253 may also be configured to allow the service user to give an appropriate name to the portable charger 12. It is possible that when the battery ID is registered, the application software AS1 and the service server 14 may store the user ID and the battery ID in association with each other. The official website display screen 254 is configured to display the official website of the charging service to allow the service user to obtain necessary information.

Hereinabove, an embodiment of the screen configuration shown in FIG. 4 has been described. FIG. 4 illustrates a configuration of typical screens displayed on the mobile communication terminal 13 by the application software AS1. The application software AS1 may also be provided with other screens that are not included in FIG. 4, and the embodiments are not limited to that shown in FIG. 4.

Various embodiments of the charging service system have been described hereinabove according to the present disclosure. For convenience, the foregoing description assumes that the service user of the charging service is the same as the subscriber of the charging service. However, it may sometimes be the case that the service user of the charging service is not the same as the subscriber of the charging service. For example, it is possible that the a parent of the service user or a company to which the service user belongs may have the ownership of the portable charger 12 or the mobile communication terminal 13 so that they can be lent to the service user. In this respect, the portable charger 12 and the mobile communication terminal 13 may be the devices that can be used by the service user as his/her own devices, for example. It is not necessary that the service user have the ownership of the portable charger 12 and the mobile communication terminal 13. Whether or not the service user is the subscriber of the mobile phone service provider is not a problem either. It should be noted that the term "service user" means a person who uses a portable charger 12 and a mobile communication terminal 13 and receives rapid charging service from the charging apparatus 11 to the portable charger 12. The term "subscriber of the charging service" means a person who has contractual rights and obligations such as payment in relation to the service provider offering the charging service. The subscriber of the charging service may be, for example, a legal entity. Thus, the portable charger 12 and the mobile communication terminal 13 may be those that are lent from the subscriber of the charging service to the service user.

As mentioned above, it may sometimes the case that the portable charger 12 and the mobile communication terminal 13 are lent to the service user and the subscriber of the charging service does not match the service user. When this is the case, the "validity of the service user's right to receive the charging service" can be specified based on a contractual agreement between the service provider offering the charging service and the service user. The "user ID" may not necessarily be one that identifies the service user themselves. The user ID may be an ID that has significance as an ID for identifying the mobile communication terminal 13. The user ID may not be one that identifies the service user themselves but may be one that has significance as an ID for identifying the subscriber. The "user ID" may be an identifier assigned to identify the service user or the subscriber in determining the validity of the right to receive charging to the portable charger 12 identified by a battery ID. In addition, it is possible that the number of mobile communication terminals 13 and the number of portable chargers 12 that are allowed to be used with one user ID may be defined or limited by a process on software according to the agreement with the subscriber of the charging service.

Herein, as illustrated in FIG. 1, the portable charger 12 used in the charging service system may include a battery cell 12d, the wireless power receiving device 12a configured to be communicable with the charging apparatus 11 through the wireless power transfer device 11a of the charging apparatus 11, the communication device 12b being communicable with the mobile communication terminal 13, and the controller 12c. The controller 12c is configured to cause the wireless power receiving device 12a to start receiving electric power when receiving a start charging signal from the mobile communication terminal 13. Such a portable charger 12 can be charged wirelessly, and charging is started when the portable charger 12 is placed on the charging apparatus 11 and operated by the mobile communication terminal 13.

The controller 12c may be configured to transmit the battery ID pre-assigned to the portable charger 12 in response to a request signal from the mobile communication terminal 13. This allows the portable charger 12 to be identified by the battery ID. Therefore, it is ensured that the portable charger 12 is recognized by the mobile communication terminal 13. As a result, the portable charger 12 identified by the battery ID can be reliably operated by the mobile communication terminal 13.

In addition, the portable charger 12 may be configured so that a relay of the wireless power receiving device 12a is turned ON when the portable charger 12 receives a start charging signal from the mobile communication terminal 13. This configuration allows the mobile communication terminal 13 to start wireless charging. In addition, the portable charger 12 may be configured to transmit a predetermined signal to the mobile communication terminal 13 when wireless charging with the charging apparatus 11 is interrupted. This enables the mobile communication terminal 13 to detect interruption of wireless charging.

In addition, the application software AS1 incorporated in the mobile communication terminal 13 is configured to cause the mobile communication terminal 13 to communicably connect to the service server 14 offering the charging service to a predetermined portable charger 12, communicate with the predetermined portable charger 12, acquire a battery ID from the portable charger 12, and transmit information to the service server 14 so that the battery ID and a user ID assigned to the user are associated with each other and stored in the service server 14. This makes it possible to provide a mobile communication terminal 13 that can cooperate with the portable charger 12 and the service server 14 and manage the battery ID and the user ID in association with each other.

Furthermore, the application software AS1 may be configured to control the mobile communication terminal 13 so as to be able to send a start charging signal to the portable charger 12 identified by the battery ID if the service user's right to receive the charging service is valid in cooperation with the service server 14.

The service server 14 for the charging service stores the validity of the service user's right to receive the charging service to the portable charger 12, the battery ID (Bx) for identifying the portable charger 12, and the user ID (Ux) for identifying the service user, in association with each other. Also, the service server 14 is configured to determine the validity of the user's right to receive the charging service to the portable charger based on the battery ID and the user ID acquired by communication with the mobile communication terminal 13, and transmit a result of the determination to the mobile communication terminal 13. As a result, the service server 14 is able to provide the charging service based on the service user's right according to the agreement with the user of the charging service by cooperation with the mobile communication terminal 13.

Various embodiments of the charging service system have been described hereinabove according to the present disclosure. Unless specifically stated otherwise, the embodiments of the charging service system described herein do not limit the scope of the present invention. It should be noted that various other modifications and alterations may be possible in the embodiments of the charging, service system disclosed herein. In addition, the features, structures, or steps described herein may be omitted as appropriate, or may be combined in any suitable combinations, unless specifically stated otherwise.

The invention claimed is:

1. A charging service system comprising:
a changing apparatus, a portable charger, a mobile communication terminal, and a service server, wherein:
the charging apparatus includes a wireless power transfer device;
the portable charger possesses a preassigned battery ID, and includes a wireless power receiving device corresponding to the wireless power transfer device and a communication device being communicable with the mobile communication terminal;
the mobile communication terminal stores the battery ID and a user ID in association with each other;
the service server stores the battery ID, the user ID, and a validity of a service user's right to receive a charging service in association with each other;
the service server is configured to acquire the battery ID and the user ID from the mobile communication terminal and execute an authentication process of determining the validity of the service user's right to receive the charging service for the portable charger identified by the acquired battery ID based on the acquired user ID;
the mobile communication terminal includes an application software installed thereon, for connecting the mobile communication terminal to the service server; and
the application software is configured to be launched on the mobile communication terminal when detecting that the portable charger is placed on the charging apparatus and thereafter connect the mobile communication terminal to the service server, to execute the authentication process.

2. The charging service system according to claim 1, wherein, if the service user's right to receive the charging service is valid, the mobile communication terminal is allowed to send a start charging signal to the portable charger identified by the battery ID.

3. The charging service system according to claim 1, wherein, if the service user's right to receive the charging service is valid, the mobile communication terminal acquires the battery ID from the service server, and is allowed to send a start charging signal to the portable charger identified by the battery ID stored in the service server.

4. The charging service system according to claim 1, wherein the mobile communication terminal is configured to execute a report process of prompting the user to place the portable charger onto the charging apparatus if the service user's right to receive the charging service is valid.

5. The charging service system according to claim 1, wherein the application software is configured to cause the mobile communication terminal to display an instruction button for permitting the portable charger to start charging if the authentication process determines that the service user's right to receive the charging service is valid.

6. The charging service system according to claim 1, wherein:
the mobile communication terminal is configured to transmit an instruction signal for starting charging to the portable charger after the authentication process is executed; and
the charging apparatus and the portable charger perform wireless power transfer from the charging apparatus to the portable charger based on the instruction signal received by the portable charger.

7. The charging service system according to claim 1, wherein:
the mobile communication terminal is configured to transmit a power transfer condition signal based on a power transfer condition of wireless power transfer to the portable charger after the authentication process is executed; and
the charging apparatus and the portable charger perform wireless power transfer from the charging apparatus to the portable charger based on a condition specified by the power transfer condition signal received by the portable charger.

8. The charging service system according to claim 1, wherein the mobile communication terminal is configured to cause a display screen of the mobile communication terminal to display a charging status while the wireless power transfer is being performed from the charging apparatus to the portable charger.

9. The charging service system according to claim 1, wherein the mobile communication terminal is configured to transmit usage information based on a charging status to the service server after wireless power transfer is complete.

10. The charging service system according to claim 9, wherein the service server is configured to perform a billing process to a service user identified by an identity verification in advance based on the usage information.

11. A portable charger comprising:
a battery cell;
a wireless power receiving device configured to be communicable through a wireless power transfer device of a charging apparatus;
a communication device being communicable with a mobile communication terminal; and
a controller, wherein
the controller is configured to cause the wireless power receiving device to start receiving electric power when receiving a start charging signal from the mobile communication terminal;
the mobile communication terminal includes an application software installed thereon, for connecting the mobile communication terminal to the controller; and
the application software is configured to be launched on the mobile communication terminal when detecting that the portable charger is placed on the charging apparatus and thereafter connect the mobile communication terminal to the controller, to execute an authentication process of determining validity of a service user's right to receive a charging service for the portable charger.

12. The portable charger according to claim 11, wherein the controller is configured to transmit a battery ID preassigned to the portable charger in response to a request signal from the mobile communication terminal.

13. The portable charger according to claim 11, configured to turn on a relay of the wireless power receiving device when receiving a start charging signal from the mobile communication terminal.

14. The portable charger according to claim 11, configured to transmit a predetermined signal to the mobile communication terminal when wireless charging with the charging apparatus is interrupted.

15. A service server for a charging service configured to:
store a validity of a user's right to receive the charging service to a portable charger, a battery ID for identifying the portable charger, and a user ID for identifying the user, in association with each other; and determine the validity of the user's right to receive the charging service to the portable charger based on the battery ID and the user ID acquired by communication with a mobile communication terminal, and transmit a result of the determination to the mobile communication terminal, wherein the mobile communication terminal includes an application software installed thereon, for connecting the mobile communication terminal to the service server; and the application software is configured to be launched on the mobile communication terminal when detecting that the portable charger is placed on the charging apparatus of the charging service and thereafter connect the mobile communication terminal to the service server, to execute an authentication process of determining the validity of the user's right to receive the charging service for the portable charger.

* * * * *